US012000080B2

(12) United States Patent
Noh et al.

(10) Patent No.: US 12,000,080 B2
(45) Date of Patent: *Jun. 4, 2024

(54) LAUNDRY TREATMENT APPARATUS AND METHOD OF CONTROLLING THE SAME

(71) Applicant: LG Electronics Inc., Seoul (KR)

(72) Inventors: Hyunwoo Noh, Seoul (KR); Changoh Kim, Seoul (KR); Sangwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 414 days.

This patent is subject to a terminal disclaimer.

(21) Appl. No.: 17/357,258

(22) Filed: Jun. 24, 2021

(65) Prior Publication Data

US 2021/0317609 A1 Oct. 14, 2021

Related U.S. Application Data

(63) Continuation of application No. 16/059,117, filed on Aug. 9, 2018, now Pat. No. 11,053,633.

(30) Foreign Application Priority Data

Aug. 9, 2017 (KR) ........................ 10-2017-0101333

(51) Int. Cl.
*D06F 58/24* (2006.01)
*D06F 25/00* (2006.01)
(Continued)

(52) U.S. Cl.
CPC .............. *D06F 58/24* (2013.01); *D06F 58/16* (2013.01); *D06F 25/00* (2013.01); *D06F 37/267* (2013.01);
(Continued)

(58) Field of Classification Search
None
See application file for complete search history.

(56) References Cited

U.S. PATENT DOCUMENTS

2003/0233854 A1 12/2003 Matsuda et al.
2006/0179896 A1 8/2006 Lim et al.
(Continued)

FOREIGN PATENT DOCUMENTS

CN 203383059 1/2014
CN 103590216 2/2014
(Continued)

OTHER PUBLICATIONS

Office Action in Korean Appln. No. 10-2022-0057126, dated Sep. 29, 2022, 8 pages (with English translation).
(Continued)

*Primary Examiner* — Rita P Adhlakha
(74) *Attorney, Agent, or Firm* — Fish & Richardson P.C.

(57) ABSTRACT

Disclosed is a laundry treatment apparatus configured to condense moisture by supplying cooling water to the interior of a tub containing laundry therein. The laundry treatment apparatus includes a tub, a drum rotatably provided in the tub, a cooling water port provided at the inner rear surface of the tub so as to be adjacent to the inner side surface of the tub in order to supply cooling water along the inner side surface of the tub, and a guide rib formed so as to protrude from the inner side surface of the tub in a radially inward direction of the tub and to extend from the cooling water port toward the front side of the tub in order to disperse the cooling water supplied from the cooling water port on the inner surface of the tub. The apparatus is capable of reducing energy consumption and improving drying performance.

15 Claims, 9 Drawing Sheets

(51) Int. Cl.
*D06F 37/26* (2006.01)
*D06F 58/02* (2006.01)
*D06F 58/04* (2006.01)
*D06F 58/16* (2006.01)
*D06F 58/26* (2006.01)

(52) U.S. Cl.
CPC .............. *D06F 58/02* (2013.01); *D06F 58/04* (2013.01); *D06F 58/26* (2013.01)

(56) References Cited

U.S. PATENT DOCUMENTS

| | | |
|---|---|---|
| 2007/0033970 A1 | 2/2007 | Lee et al. |
| 2011/0167663 A1 | 7/2011 | Lim et al. |

FOREIGN PATENT DOCUMENTS

| | | |
|---|---|---|
| DE | 102014208514 | 11/2015 |
| DE | 102016110859 | 6/2017 |
| EP | 1752575 | 2/2007 |
| EP | 1914339 | 4/2008 |
| EP | 2400052 | 12/2011 |
| EP | 3287559 A1 * | 2/2018 ............ D06F 25/00 |
| FR | 2711153 | 4/1995 |
| JP | 1973-008512 | 1/1973 |
| JP | 2014-056684 | 3/2014 |
| KR | 20050050284 | 5/2005 |
| KR | 101336706 | 8/2008 |
| KR | 20110125390 | 11/2011 |
| KR | 20140023634 | 2/2014 |
| KR | 10-2023-2514302 | 3/2023 |
| WO | WO2019185257 | 10/2019 |

OTHER PUBLICATIONS

Extended European Search Report in European Appln. No. 22193704.8, dated Jan. 11, 2023, 8 pages.

Office Action in Korean Appln. No. 2011-507600, dated Dec. 6, 2021, 15 pages (with English translation).

Office Action in U.S. Appl. No. 16/059,117, dated Sep. 3, 2020, 13 pages.

Office Action in Australian Appln. No. 2021232705, dated Aug. 15, 2022, 8 pages.

Office Action in Korean Appln. No. 10-2022-0057126, dated May 10, 2023, 9 pages (with English machine translation).

* cited by examiner

LAUNDRY TREATMENT APPARATUS AND METHOD OF CONTROLLING THE SAME

CROSS-REFERENCE TO RELATED APPLICATIONS

This application is a continuation of U.S. application Ser. No. 16/059,117, filed on Aug. 9, 2018, which claims the benefit of Korean Patent Application No. 10-2017-0101333, filed on Aug. 9, 2017. The disclosures of the prior applications are incorporated by reference in their entirety.

TECHNICAL FIELD

The present invention relates to a laundry treatment apparatus configured to condense moisture by supplying cooling water to the interior of a tub containing laundry therein, and more particularly, to a laundry treatment apparatus capable of reducing energy consumption and improving drying performance by improving condensing performance.

BACKGROUND

Generally, laundry treatment apparatuses are apparatuses for treating laundry, specifically, for washing, drying or refreshing laundry.

There are various kinds of laundry treatment apparatuses, for example, a washing machine mainly adapted to wash laundry, a drying machine mainly adapted to dry laundry, and a refresher mainly adapted to refresh laundry.

There is also a laundry treatment apparatus that can perform at least two laundry-treating processes, among washing, drying and refreshing, in a single body. For example, a combined washing and drying machine is a kind of laundry treatment apparatus that can perform all of washing, drying and refreshing in a single body.

Further, there has recently been developed a laundry treatment apparatus that includes two laundry treating bodies, both of which perform washing at the same time, or one of which performs washing and the other of which performs drying simultaneously therewith.

A laundry treatment apparatus may be provided with a heating device for heating wash water or air. The reason for heating wash water to increase the temperature thereof is to promote activation of detergent and breakdown of dirt in order to improve washing performance. The reason for heating air is to evaporate moisture by applying heat to wet laundry in order to dry laundry.

In general, wash water is heated by an electric heater, which is mounted to a tub in which wash water is contained. The electric heater is immersed in wash water, which contains foreign substances or detergent. Thus, foreign substances such as scale may accumulate on the electric heater, which may lead to deterioration in the performance of the electric heater.

Further, in order to heat air, there must be additionally provided a fan for moving air by force and a duct for guiding the movement of air. An electric heater or a gas heater may be used to heat air. However, such an air-heating method has generally poor efficiency.

Recently, there has been developed a drying machine that heats air using a heat pump. A heat pump is a system that uses a cooling cycle of an air-conditioning system in the opposite way, and thus requires the same constituent components as the air-conditioning system, i.e. an evaporator, a condenser, an expansion valve, and a compressor. Different from an air-conditioning system in which a condenser is used as an indoor unit to decrease the indoor temperature, a drying machine having a heat pump dries laundry using air heated by an evaporator. However, a drying machine having such a heat pump has a complicated structure, and the manufacturing costs thereof are high.

There are various methods of removing evaporated moisture in order to perform drying. Examples of moisture removal methods include a method of discharging humid air to the outside so as to omit a condensing process, a method of condensing moisture by supplying condensate water to a condensing duct provided in an air circulation path, a method of condensing moisture using a condenser of a heat pump, and a method of directly supplying cooling water to the interior of a tub so that the interior of the tub functions just like a condensing duct.

In the case in which cooling water is supplied to the interior of a tub, an increase in heat transfer area or heat transfer time between cooling water and humid air is an important factor for an increase in condensing efficiency or drying efficiency. However, it is not easy to increase a heat transfer area or heat transfer time. Therefore, the need to find a way to increase cooling efficiency through the supply of cooling water cannot be overemphasized.

An electric heater, a gas heater and a heat pump, which are used as heating devices in various laundry treatment apparatuses, have their own advantages and disadvantages. Laundry treatment apparatuses having new heating devices using induction heating, which can enhance the advantages of the above conventional heating devices and compensate for the disadvantages thereof, are disclosed in Japanese Registered Patent No. 2001070689 and Korean Registered Patent No. 10-922986.

However, these related art documents disclose only a basic concept of induction heating for a washing machine, and do not disclose concrete constituent components of an induction heating module, connection and operational relationships with the constituent components of a laundry treatment apparatus, or a concrete method or configuration for improving efficiency and securing safety.

Various and concrete technologies for improving efficiency and securing safety need to be applied to a laundry treatment apparatus utilizing an induction heating principle.

Further, the above related art documents do not specifically mention the necessity of cooling an induction module that performs induction heating, a cooling structure, a concrete structure of an induction module for cooling, or the necessity of cooling the outer circumferential surface of a tub.

Concrete technologies for effectively cooling an induction module or a module control unit for controlling the output of an induction module need to be applied to a laundry treatment apparatus utilizing an induction heating principle.

SUMMARY

Accordingly, the present invention is directed to a laundry treatment apparatus that substantially obviates one or more problems due to limitations and disadvantages of the related art.

An object of the present invention is to provide a laundry treatment apparatus that is capable of reducing energy consumption and enhancing drying performance by effectively improving moisture-condensing performance using cooling water.

Another object of the present invention is to provide a laundry treatment apparatus that is capable of highly effectively enhancing drying performance and reducing energy consumption through addition of a simple structure or a change in the structure.

Still another object of the present invention is to provide a laundry treatment apparatus that is capable of greatly increasing a heat transfer area and heat transfer time of cooling water using a guide rib that guides movement of the cooling water.

Yet another object of the present invention is to provide a laundry treatment apparatus that is capable of cooling the outer circumferential surface of a tub while performing a drying process, thereby restricting an increase in temperature of the tub attributable to the drying process and consequently improving drying performance.

Still yet another object of the present invention is to provide a laundry treatment apparatus that is capable of improving safety, stability and efficiency.

A further object of the present invention is to provide a laundry treatment apparatus that is capable of improving efficiency and stability by effectively cooling an induction module and a module control unit.

Yet a further object of the present invention is to provide a laundry treatment apparatus that has high economic feasibility by cooling an induction module, a module control unit and the outer circumferential surface of a tub by driving a single fan.

Still a further object of the present invention is to provide a laundry treatment apparatus in which an induction module can be stably coupled to a tub and in which an internal air flow path and an air discharge path are formed so as to effectively cool the induction module and to also cool the outer circumferential surface of the tub simultaneously therewith.

Yet another further object of the present invention is to provide a laundry treatment apparatus in which an induction module and a module control unit are provided individually and are mounted to a tub and a cabinet, respectively, thereby enhancing the performance exhibited by the induction module and securing the stability of the module control unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the object and other advantages and in accordance with the purpose of the invention, as embodied and broadly described herein, a laundry treatment apparatus includes a tub, a drum rotatably provided in the tub, a cooling water port provided at the inner rear surface of the tub so as to be adjacent to the inner side surface of the tub in order to supply cooling water along the inner side surface of the tub, and a guide rib formed so as to protrude from the inner side surface of the tub in a radially inward direction of the tub and to extend from the cooling water port toward the front side of the tub in order to disperse the cooling water supplied from the cooling water port on the inner surface of the tub.

The guide rib may be formed so as to extend forwards from the center in the upward-and-downward direction of the cooling water port so that the cooling water supplied from the cooling water port flows along the top surface and the bottom surface of the guide rib.

The center in the upward-and-downward direction of the cooling water port may be aligned with or may be located above the center in the upward-and-downward direction of the tub.

The cooling water port may be formed so that cooling water is discharged toward the front side of the tub. Therefore, the cooling water discharged from the cooling water port may gradually flow downwards while moving forwards due to the discharge pressure and gravity. Since a substantially single stream of cooling water is discharged from the cooling water port, the contact area with air may be very small. Therefore, a guide rib may be provided to increase the contact area with air.

Through the guide rib, the cooling water, which is widely dispersed like a curtain, may flow downwards along the inner circumferential surface of the tub.

The cross-sectional area of the cooling water port may be greater than the cross-sectional area of the guide rib.

The cooling water discharged from the cooling water port moves forwards along the bottom surface of the guide rib and gradually flows downwards along the side surface of the tub. This downward flow of the cooling water may be continuously realized corresponding to the length of the guide rib from the bottom surface of the guide rib.

The cooling water discharged from the cooling water port may move forwards along the top surface of the guide rib. A portion of the cooling water may move further forwards than the guide rib and may flow downwards. Therefore, the length at which the cooling water flows downwards is greater than the length of the guide rib. This means that the contact area between the cooling water and air can be further increased.

The cooling water port may be located at an angular position that is located above the center in the upward-and-downward direction of the tub at an angle ranging from 5 degrees to 10 degrees. It is possible to move the cooling water port to a higher position due to the guide rib. Therefore, condensing performance can be further improved through an increase in the heat transfer time and the heat transfer area.

The cooling water port may be provided in two parts, each being formed at a respective one of the left side and the right side of the tub, and the guide rib may be provided in two parts, each being formed at a respective one of the left side and the right side of the tub.

The two parts of the cooling water port, formed at the left side and the right side of the tub, may branch from a single cooling water supply path. The supply of cooling water through the two parts of the cooling water port and the supply of cooling water through any one of the two parts of the cooling water port may be selectively performed. That is, the number of cooling water ports for supplying cooling water may vary so as to prevent the occurrence of excessive cooling or insufficient cooling. In the event of excessive cooling, only one cooling water port may supply cooling water, and in the event of insufficient cooling, the two cooling water ports may supply cooling water.

The guide rib may have a cross-section formed in the shape of a rectangle that has a lateral width greater than a height thereof. The guide rib having a rectangular-shaped cross-section may provide a larger contact area than a guide rib having a circular-shaped cross-section.

The guide rib may extend at a downward incline toward the front side of the tub.

The laundry treatment apparatus may further include at least one auxiliary guide rib formed so as to protrude from the inner side surface of the tub in the radially inward direction of the tub and to be disposed under the guide rib while being spaced apart therefrom in order to re-disperse the cooling water dispersed by the guide rib.

The at least one auxiliary guide rib may be formed so as to extend further toward the front side of the tub than the guide rib.

The at least one auxiliary guide rib may include a plurality of auxiliary guide ribs, and the plurality of auxiliary guide ribs may include an upper auxiliary guide rib and a lower auxiliary guide rib located under the upper auxiliary guide rib.

The lower auxiliary guide rib may be formed so as to extend further toward the front side of the tub than the upper auxiliary guide rib.

The drum may be formed of a metallic material, and the laundry treatment apparatus may further include an induction module provided on an outer side surface of the tub so as to be spaced apart from the circumferential surface of the drum in order to heat the circumferential surface of the drum using a magnetic field generated by applying current to a coil. That is, there may be provided a laundry treatment apparatus that is capable of performing a drying process by heating the drum using the induction module.

The laundry treatment apparatus may further include a controller (a main control unit) for controlling the operation of the induction module, the rotation of the drum and the supply of the cooling water in order to perform a process of drying laundry in the laundry treatment apparatus.

The laundry treatment apparatus may further include a module control unit for controlling the output of the induction module, a cooling path through which the outside of the cabinet, the interior of the module control unit and the interior of the induction module communicate sequentially with each other, and a fan provided in the cooling path.

The induction module may include a base housing to which the coil is secured, the base housing being mounted on the outer circumferential surface of the tub, and a cover coupled to the upper side of the base housing in order to form a space inside the induction module.

The base housing may include a mounting slot formed in the top surface of the base housing to allow the coil to be mounted thereto, a seating rib protruding downwards from the bottom surface of the base housing to be seated on the outer circumferential surface of the tub, and an opening formed so as to penetrate the top surface and the bottom surface of the base housing.

The induction module may include a base housing to which the coil is secured, the base housing being mounted on the outer circumferential surface of the tub, a cover coupled to the upper side of the base housing in order to form a space inside the induction module, and a fan mounted to the cover in order to draw air into the induction module from outside the induction module.

The base housing may include a mounting slot formed in the top surface of the base housing to allow the coil to be mounted thereto, a seating rib protruding downwards from the bottom surface of the base housing to be seated on the outer circumferential surface of the tub, and an opening formed so as to penetrate the top surface and the bottom surface of the base housing.

The base housing may include a sealed portion in which the opening is not formed, and the seating rib may be formed at a portion of the bottom surface of the base housing that defines the sealed portion.

Therefore, the air that has cooled the induction module may be discharged from the base housing and may cool the outer circumferential surface of the tub.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Hereinafter, exemplary embodiments of the present invention will be described in detail with reference to the accompanying drawings.

Figure 1:
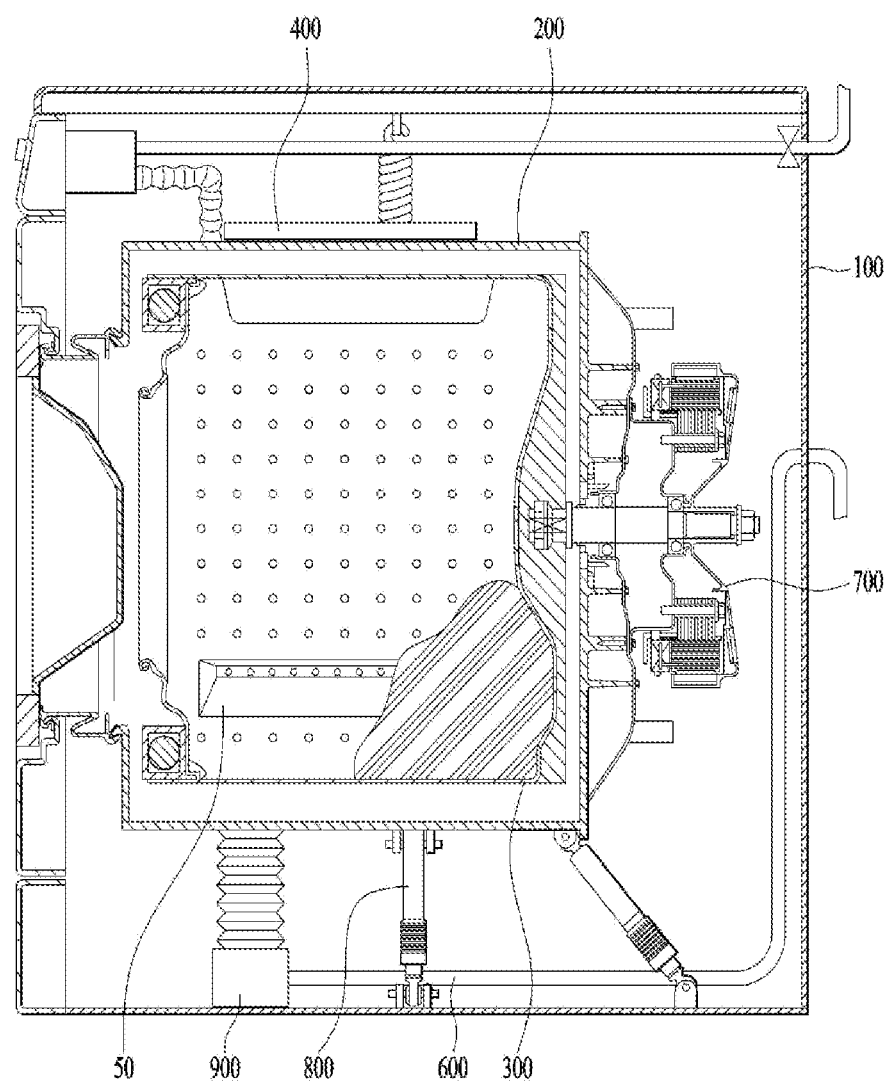
FIG. 1 is a view illustrating a laundry treatment apparatus according to an embodiment of the present invention.
Figure 2:
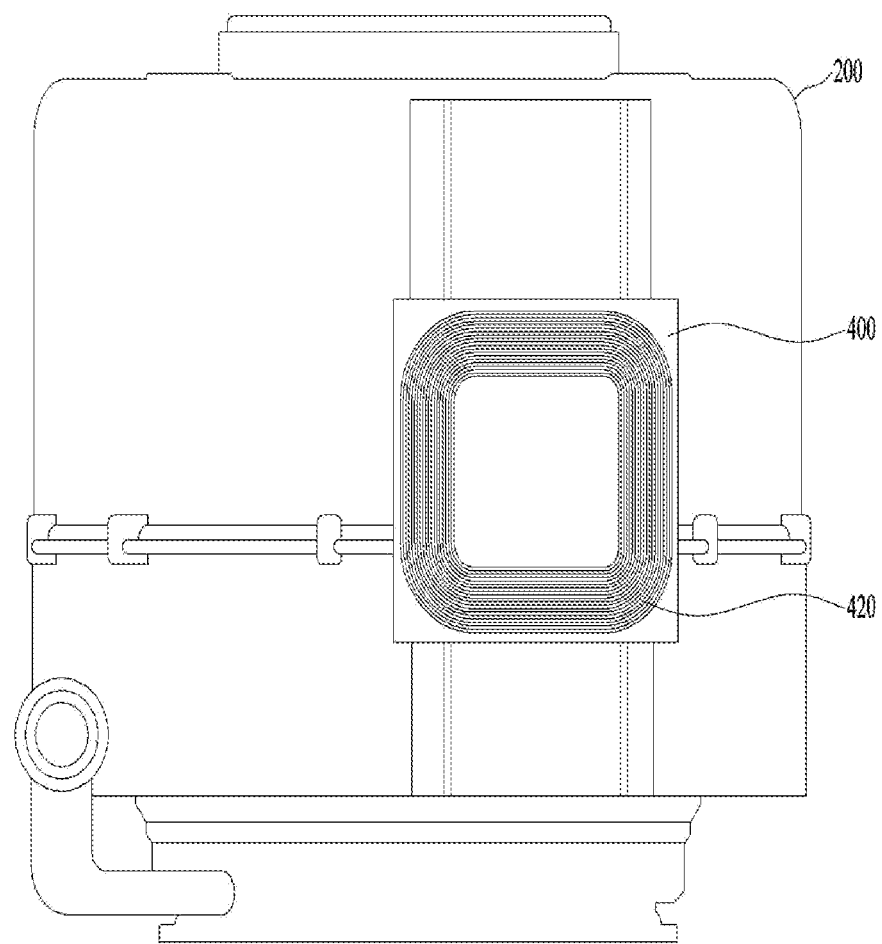
FIG. 2 is a view illustrating the configuration in which an induction module is mounted on a tub in a laundry treatment apparatus according to an embodiment of the present invention.

With reference to FIGS. 1 and 2, the fundamental components of a laundry treatment apparatus and an induction heating principle, which are applicable to an embodiment of the present invention, will be described.

As shown in FIG. 1, the fundamental components of a laundry treatment apparatus according to this embodiment may be the same or similar to those of a general laundry treatment apparatus, but the configuration thereof, in which an induction module 400 is provided therein to directly heat a drum 300, may be different from the configuration of a general laundry treatment apparatus. Since the induction module 400 is a heating device, heating devices used in a general laundry treatment apparatus may be replaced by or used together with the induction module 400.

The induction module 400 may include a coil 420, which receives electric current and forms a magnetic field. The coil 420 may be formed by winding a wire, and the direction in which the wire is wound may coincide with the center of the drum 300, which is an object to be heated. That is, the wire of the coil 420 may be wound at a position where the facing area between the wire and the outer circumferential surface of the drum 300 becomes as large as possible. The wire-winding direction and the mounting position of the coil 420 will be clearly understood through a description of the induction heating principle, which will be provided below.

When electric current is supplied to the coil 420, a magnetic field is generated in the direction in which the coil 420 is wound. That is, a magnetic field is generated in the center-axis direction of the coil 420. At this time, when alternating current, a phase of which varies, is applied to the coil 420, an alternating current (AC) magnetic field is formed such that the direction thereof varies. The AC magnetic field causes an induced magnetic field to be generated at a nearby conductor in the direction opposite thereto, and variation in the induced magnetic field causes induced current to be generated at the conductor.

That is, the induced current and the induced magnetic field may mean energy transfer from the induction module 400 to a nearby conductor due to variation in an electric field and a magnetic field.

Therefore, the drum 300 is formed of a metallic material, and the induced magnetic field generated at the coil 420 causes eddy current, which is a kind of induced current, to be generated at the drum 300.

Electric energy is converted into thermal energy by resistance to variation in the induced current, i.e. inertia, with the result that the drum 300 is heated. In this manner, the drum 300, which is spaced apart from the induction module 400, may be directly heated. It will be understood from the above-described principle that the shorter the distance between the drum and the induction module 400 and the larger the facing area between the drum and the induction module 400, the higher the efficiency of energy transfer from the induction module 400 to the drum.

In other words, it can be known that energy is more efficiently transferred from the induction module 400 to one of objects having the same unit area, which is closer to the induction module 400 and is more closely parallel to the induction module 400 than the other.

The induction module 400 may be mounted on the outer circumferential surface of the tub 200. Of course, the induction module 400 may be mounted on the inner circumferential surface of the tub 200 so as to decrease the distance between the induction module 400 and the drum. However, it is desirable for the induction module 400 to be mounted on the outer circumferential surface of the tub 200 in consideration of the possibility of collision between the drum 300, which rotates and vibrates, and the induction module 400 and the possibility of damage to the induction module 400 under the high-temperature and high-humidity environment in the tub 200.

The tub 200 is mounted inside a cabinet 100 that forms the external appearance of the laundry treatment apparatus, and the drum 300 is rotatably mounted inside the tub 200. A motor 700 for driving the drum may be mounted to the rear surface of the tub 200. Therefore, the drum may be driven by the motor 700 and may rotate inside the tub.

The tub is supported by a support device 800, such as, for example, a damper or a spring, inside the cabinet 100. The support device may be disposed under the tub 200. A drain pump 900 may be provided under the tub.

As shown in FIGS. 1 and 2, the induction module 400 may be formed so as to extend long in the forward-and-backward direction of the tub, and may be mounted on the outer circumferential surface of the tub 200. It is desirable for the induction module 400 to be mounted on the outer circumferential surface of the upper portion of the tub. The reason for this is that space for mounting the induction module 400 on the outer circumferential surface of the lower portion of the tub 200 may not be sufficient due to the support device 800, the drain pump 900 or other components, which are disposed under the tub as described above.

The induction module 400 may face a portion of the outer circumferential surface of the drum in the state in which the drum is stationary. Therefore, when electric current is applied to the induction module 400, only a portion of the outer circumferential surface of the drum may be substantially heated. However, while the induction module 400 is operating, if the drum 300 rotates, the entire outer circumferential surface of the drum may be evenly heated.

Considering the heating efficiency of the induction module 400, it is desirable not to heat the front side and the rear side of the drum 300. The reason for this is that laundry substantially gathers in the center portion in the forward-and-backward direction of the drum when treated in the drum. That is, when heat is transferred from the heated drum to the laundry contained therein, the amount of heat that is transferred from the front side and the rear side of the drum 300 to the laundry is extremely small. Therefore, it may deteriorate the heating efficiency of the induction module 400 to heat the front side and the rear side of the drum 300.

Therefore, it is desirable to mount the induction module 400 such that the induction module 400 extends forwards and backwards from the center portion in the forward-and-backward direction of the tub 200.

The drum 300 may be provided therein with a lifter 50 to agitate laundry in the drum. The lifter 50 may function to lift laundry up as the drum 300 rotates. The laundry lifted up by the lifter 50 falls. In this manner, the lifter 50 may improve washing performance and drying performance. The lifter is generally considered an essential component of a laundry treatment apparatus having a drum.

Hereinafter, with reference to FIG. 3, the induction module, the module control unit and the cooling structure for cooling these components of the laundry treatment apparatus according to an embodiment of the present invention will be described in detail.

The induction module 400 for heating the drum may be mounted on the outer circumferential surface of the upper portion of the tub 200. The module control unit 80 for controlling the output of the induction module 400 may be disposed near the induction module 400.

The induction module 400 includes the coil 420, to which high current is applied. The current that is applied to the coil may by alternating current. Therefore, when current is applied to the coil 420, heat may be generated from the coil 420. In the case in which the heat generated from the coil 420 is not eliminated, efficiency may be deteriorated.

The module control unit 80 for controlling the output of the induction module 400 may be provided with a power transistor such as, for example, an insulated gate bipolar transistor (IGBT). The amount of heat generated from the power transistor is very large. About 80% of the whole amount of heat generated from the induction module 400 and the module control unit 80 may be generated from the power transistor, about 10% thereof may be generated from the coil 420, and the remaining about 10% thereof may be generated from a substrate and various elements provided in the module control unit 80.

In order to secure the normal operation of the power transistor and the various elements of the substrate, these components need to be cooled appropriately.

Thus, a structure for cooling the module control unit 80 as well as the induction module 400 is required.

This embodiment provides a laundry treatment apparatus that is capable of effectively cooling the module control unit 80 as well as the induction module 400 using a single fan 450. Further, this embodiment provides a laundry treatment apparatus that is also capable of cooling the outer circumferential surface of the tub using the single fan 450.

Figure 3:
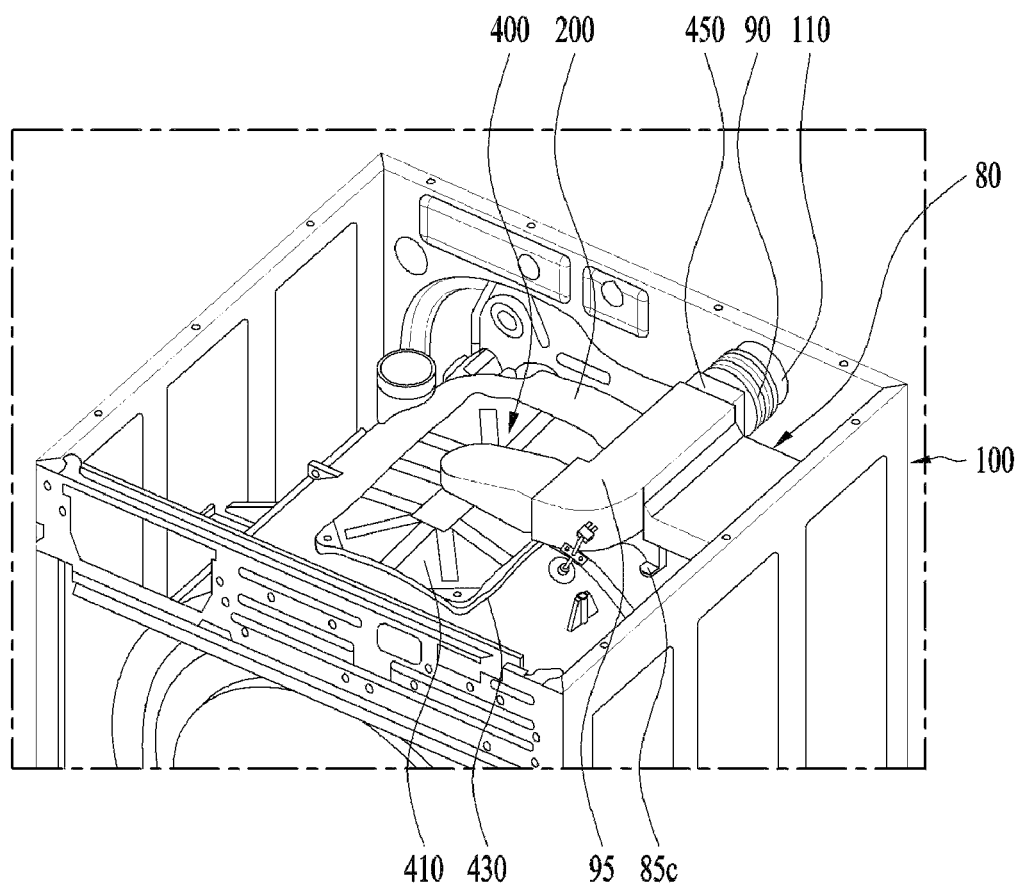
FIG. 3 is a view illustrating the positions of an induction module and a module control unit according to an embodiment of the present invention.

As shown in FIG. 3, the module control unit 80 and the induction module 400 may be formed so as to communicate with each other through a cooling path 95. The cooling path 95 may be provided with the fan 450. The cooling path 95 may be defined by a housing of the module control unit 80 and a housing of the induction module 400. That is, the cooling path 95 may be formed by connecting the housing of the module control unit 80 and the housing of the induction module 400 to each other.

The cooling path 95 may be formed so as to communicate with the outside of the cabinet 100. To this end, a duct may be provided. The cabinet 100 may have therein a ventilation hole 110. The cooling path may include a connection duct 90, which is connected to the ventilation hole 110. Because the tub 200 vibrates relative to the cabinet 100, the connection duct 90 may be formed in a bellows type. That is, the connection duct may be formed as a flexible bellows.

Only one side of the bellows-type connection duct 90 of the cooling path 95 may be connected to the cabinet 100, and the remaining portion of the cooling path 95, the module control unit 80 and the induction module 400 may be fixed to the tub 200. Thus, the module control unit 80 and the induction module 400, which are coupled to the tub, may vibrate together with the tub.

In general, the temperature of the air in the cabinet 100 is higher than the temperature of the air outside the cabinet 100. Therefore, in order to improve cooling performance, it is very desirable to use the air outside the cabinet 100 for cooling.

The air introduced into the module control unit 80 through the cooling path 95 cools the interior of the module control unit 80, and is then discharged outside the module control unit 80. The air discharged outside the module control unit 80 is introduced into the induction module 400 through the cooling path 95. That is, the air that has cooled the module control unit 80 is introduced into the induction module 400 to cool the interior of the induction module 400. Thereafter, the air is discharged outside the induction module 400.

The air discharged from the induction module 400 may collide with the outer circumferential surface of the tub. Therefore, the heated outer circumferential surface of the tub may also be cooled by the air discharged from the cooling path 95.

As described above, according to this embodiment, the external air introduced by a single fan can cool the module control unit, the induction module and the outer circumferential surface of the tub sequentially.

Figure 4:
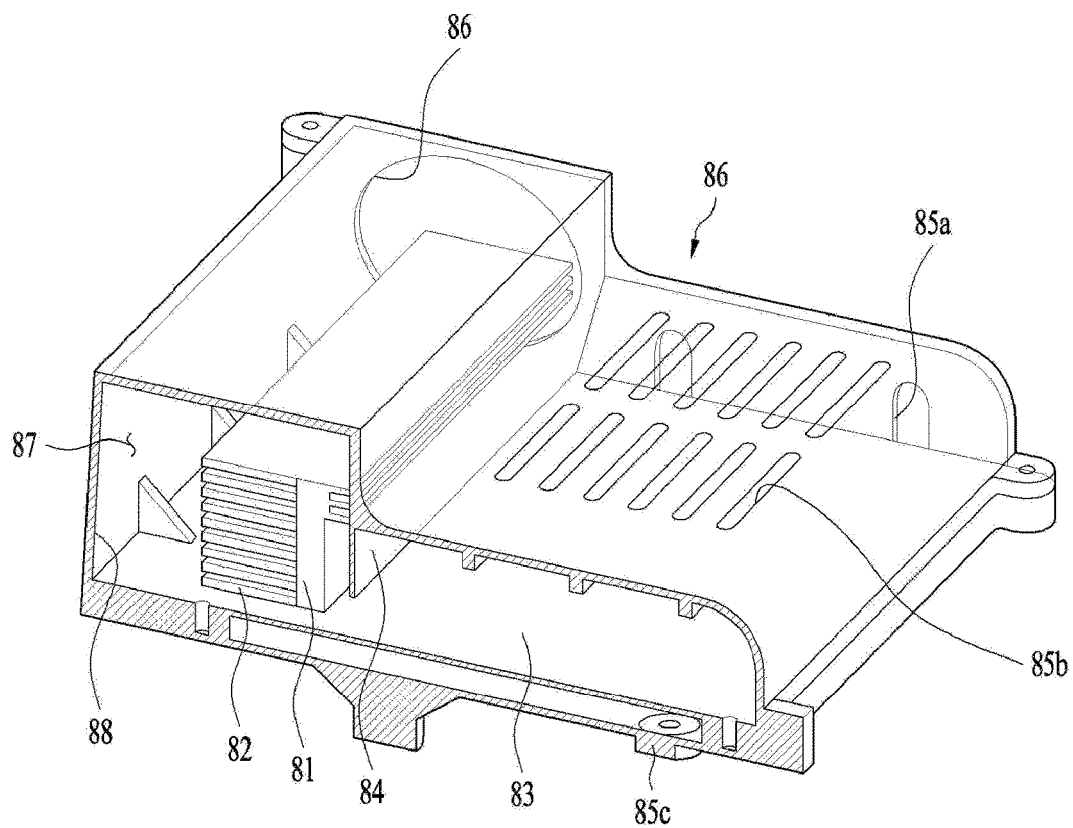
FIG. 4 is a view illustrating the module control unit shown in FIG. 3.

A detailed explanation of the module control unit 80 will be made with reference to FIG. 4.

The module control unit 80 may include a housing 85, in which an air flow path 87 is formed, a substrate 83, which is provided inside the housing 85, and a power transistor 81, which is mounted on the substrate 83. Of course, various other elements may also be mounted on the substrate 83.

Among the components of the module control unit 80, the power transistor 81 generates the largest amount of heat. Thus, heat dissipation from the power transistor 81 is very important. To this end, the air flow path 87 may be formed along the power transistor 81.

The housing 85 may be provided with air inlet hole 86 and an air outlet hole 88. The air flow path 87 may be defined between the air inlet hole 86 and the air outlet hole 88.

The housing 85 may be formed in consideration of the area of the substrate 83, various elements to be mounted on the substrate and the size of the power transistor 81. As shown in FIG. 4, the area occupied by the power transistor 81 is relatively small. However, the amount of heat generated from the power transistor 81 is very large.

Therefore, the air flow path may be formed only in a portion of the housing 85, rather than in the entire region of the housing 85. That is, it is more effective to intensively cool the power transistor 81 by forming the air flow path only in the portion of the housing 85 that corresponds to the power transistor 81, which generates the largest amount of heat.

The reason for this is that, assuming that the amount of air introduced into an air flow path is constant, the larger the cross-sectional area of the air flow path, the lower the cooling performance achievable using the air flow path. Accordingly, it is desirable that the air flow path be formed only in a region in which the power transistor 81 is mounted.

In addition, a heat sink 82 may be provided to dissipate heat from the power transistor 81. The heat sink 82 may be formed of a metallic material having excellent thermal conductivity. The heat sink 82 may be in contact with the power transistor 81 to primarily absorb heat from the power transistor 81. The heat sink 82 may be formed so as to have a plurality of cooling fins to increase a contact area with air.

The heat sink 82 may be mounted in the air flow path so that the power transistor 81 can be more effectively cooled by the cooling function of the heat sink 82. Thus, the air flow path 87 may be formed along the heat sink 82 and the power transistor 81. Specifically, the air flow path 87 may be formed in the longitudinal direction of the heat sink 82 and the power transistor 81.

In order to form the air flow path 87 in a specific portion of the housing 85, the interior of the housing 85 may be partitioned into a portion for forming the air flow path 87 therein and a remaining portion. Further, the substrate 83 may be partitioned into a portion on which the power transistor 81 is mounted and a portion on which various other elements are mounted inside the housing. To this end, the housing may be provided therein with a partition wall 84.

Most of the air that is introduced into the air flow path 87 is used to cool the heat sink 82 and the power transistor 81 due to the partition wall 84. Accordingly, it is possible to intensively cool the heat sink 82 and the power transistor 81.

A portion of the substrate 83, which is not exposed to the air flow path 87, and the elements mounted thereon may also need to be cooled, which may be realized by natural convection. That is, the interior of the housing may be partitioned into a forced cooling region influenced by the operation of the fan and a natural convection cooling region.

In order to realize natural convection, the housing 85 may have therein a penetration portion. The penetration portion may include a plurality of communication holes 85a and 85b. The communication holes 85a and 85b may include side-surface communication holes 85a and top-surface communication holes 85b. The side-surface communication holes 85a may be formed so as to be adjacent to the rear wall of the cabinet 100. That is, the side-surface communication holes 85a may be formed in the side surface of the housing 85 that is located closest to the outside of the cabinet 100. Through this configuration, the air outside the cabinet can be introduced into the housing through the side-surface communication holes.

The air heated in the housing rises. Thus, it is desirable that the top-surface communication holes 85b be formed in the top surface of the housing 85 so as to discharge the heated air therethrough. Cooling using natural convection can be achieved by the communication holes 85*a* and 85*b* and the positional relationships therebetween.

As shown in FIG. 3, the induction module 400 may be mounted to the substantial center portion in the forward-and-backward direction of the tub. The reason for this is that it is more effective for the induction module 400 to intensively heat the center portion of the drum. For this reason, the distance between the induction module 400 and the cabinet is relatively long. Thus, it is not easy to directly draw air to the induction module 400 from outside the cabinet. This is because the ventilation hole 110 is located in the rear wall of the cabinet in terms of design.

The module control unit 80 may be relatively freely located above the tub. Due to the cylindrical shape of the tub, a free space may be formed in the upward-and-downward direction between the left and right upper portions of the tub and the cabinet. Of course, a free space may be formed in the forward-and-backward direction between the left and right upper portions of the tub and the cabinet. Therefore, the module control unit 80 may be located above the tub so as to be adjacent to the rear wall of the cabinet 100.

It is more desirable to directly supply air outside the cabinet to the module control unit 80. It is also desirable that the air discharged from the module control unit 80 be used to cool the induction module, rather than being introduced into the cabinet. Through this configuration, it is possible to use only a single fan and to integrate the induction module and the module control unit into a single assembly. In this case, a connection duct for connecting the induction module and the module control unit to each other may be needed. This connection duct may be defined by the housing of the induction module and the housing of the module control unit. Thus, an additional duct structure for connecting the housings may not be needed.

A detailed explanation of the structure of the induction module 400 will be made with reference to FIG. 5.

The induction module 400 includes a base housing 430, and further includes an upper housing or a cover 410 (refer to FIG. 3), which is coupled to the base housing 430. The base housing 430 and the cover 410 may be collectively referred to as an induction module housing.

The base housing 430 is provided with the coil 420. A space is formed inside the induction module 400 through the coupling of the cover 410 to the base housing. The air introduced into the space in the induction module 400 is supplied to the coil 420 and cools the same.

The center portion of the cover 410 is connected with the connection duct. Therefore, the external air is introduced into the center portion of the induction module 400, and moves in the radial direction, thereby evenly cooling the coil 420.

This embodiment may propose a structure for cooling the coil more evenly inside the induction module 400. In the case in which air is introduced into the induction module 400 through one side thereof and is discharged through the opposite side thereof, the cooling efficiency in regions other than the region between the two opposite sides through which air is introduced and discharged is inevitably low. On the assumption that the coil 420 is arranged in the entire region in the induction module 400, it is not easy to cool the coil 420 evenly.

It is desirable that the induction module 400 be formed so as to have a relatively large planar area and a relatively low height. The reason for this is to more securely couple the induction module 400 to the tub 200 by increasing the mounting area between the induction module 400 and the tub 200 and to decrease an eccentric load that is applied to the tub 200 by the induction module 400.

Thus, it is not easy to optimize the air flow path for cooling inside the induction module 400.

Figure 5:
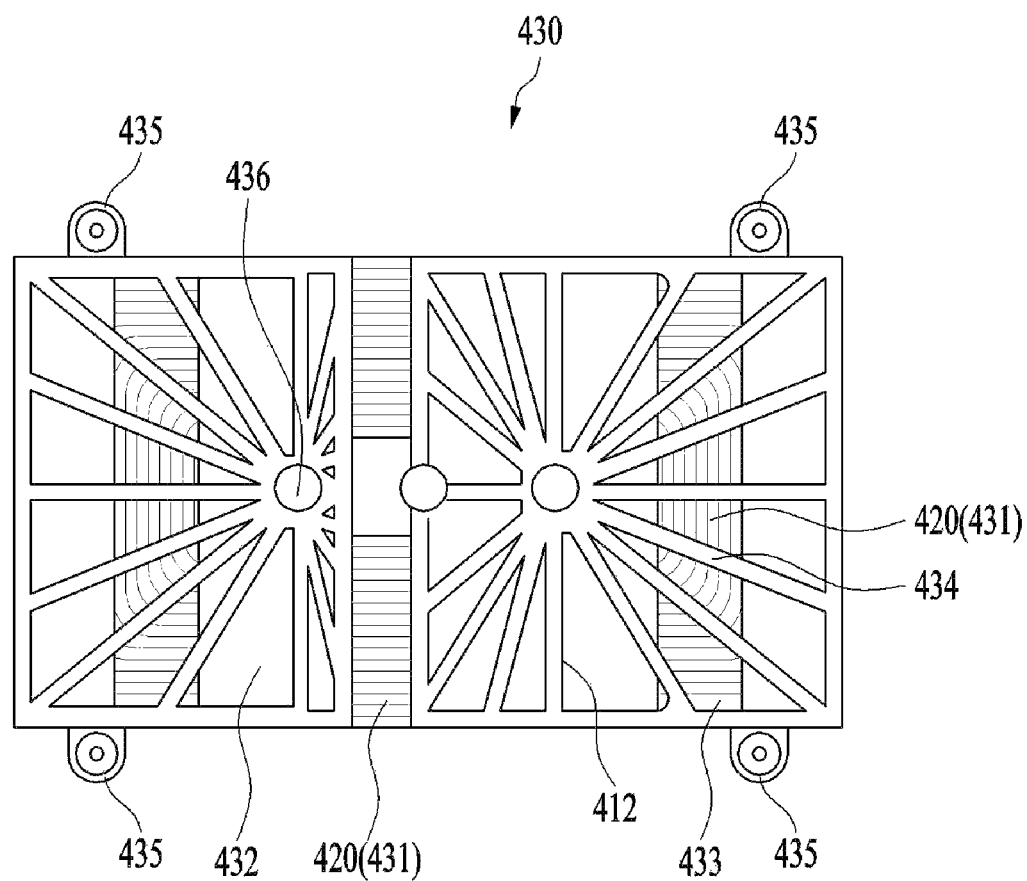
FIG. 5 is a view illustrating a base housing of the induction module.

As shown in FIG. 5, the base housing 430 may include a base 432, and may further include reinforcing ribs 434, which protrude downwards from the base 432. The base 432 may be formed to have a plate shape.

The base 432 forms a closed portion or a sealed portion, which is closed in the upward-and-downward direction. In addition to the closed portion, the base housing 430 includes an opening 433, which is formed so as to penetrate the top and bottom surfaces of the base housing 430. FIG. 5 shows an example of the base housing 430 in which a plurality of bases 432, i.e. closed portions, and a plurality of openings 433 are formed in a plurality of regions. The openings 433 may be formed corresponding to the center portion, the left portion and the right portion of the coil.

A mounting slot 431, in which the coil 420 is mounted, may be formed in the top surface of the base housing 432. The mounting slot may be formed in both the base 432 and the opening 433. The mounting slot formed in the base 432 has a closed bottom, on which the lower portion of the coil can be seated. The mounting slot formed in the opening 433 has an open bottom.

The coil 420 may be interference-fitted into the mounting slot. This is for fixing the coil 420 stably. The mounting slot formed in the opening 433 is closed in the upward-and-downward direction by the coil 420, and thus the upward/downward movement of the air through the mounting slot is not facilitated.

However, the mounting slot may not be formed in the opening 433. The opening and the closed portion may be formed alternately in the longitudinal direction of the base housing. Alternatively, the opening and the closed portion may be formed alternately in the width direction of the base housing. The reinforcing ribs may also function as the closed portion.

Therefore, many portions of the coil 420 may be fixed in the mounting slot by being interference-fitted thereinto. That is, some portions of the coil 420 may be suspended in the air. However, many portions of the coil 420 may be fixed in a plurality of positions of the mounting slot in the longitudinal direction of the coil. Particularly, both ends in the longitudinal direction of the coil may be fixed in the mounting slot. In this manner, the entire coil 420 may be stably supported.

In the case in which the mounting slot is not formed in the opening 433, a gap is formed between two adjacent portions of the wire in the opening. Air can pass through this gap.

The movement of air through the gap between two adjacent portions of the wire may not be sufficient. Further, in the case in which the mounting slot is formed in the opening, this movement of air cannot be realized. Thus, in order to secure more effective movement of air, a structure for drawing air present above the base housing 430 into the base housing 430 is needed.

To this end, a communication hole 436 may be formed in the center portion in the width direction of the base housing 430. The communication hole 436 may be provided in a plural number in the longitudinal direction of the base housing 430 (the direction corresponding to the forward-and-backward direction of the tub).

The air introduced into the lower portion of the base housing 430 through the communication hole 436 may be discharged outside the base housing 430 in the radial direction.

In order to realize this configuration, a certain gap needs to be formed between the bottom surface of the base housing 430 and the outer surface of the tub on which the base housing 430 is mounted. That is, a space through which air can be discharged needs to be formed.

To this end, the reinforcing ribs 434 protrude from the bottom surface of the base housing 430 so as to be brought into close contact with the outer circumferential surface of the tub, and the regions of the bottom surface of the base housing 430 other than the reinforcing ribs 434 are spaced apart from the outer circumferential surface of the tub.

The reinforcing ribs 434 may be formed so as to extend from the communication hole 436 in a substantially radial direction. Therefore, even if the base housing 430 is deformed, the base housing 430 can securely maintain close contact with the outer circumferential surface of the tub due to the reinforcing ribs 434.

The base housing 430 is provided with fastening portions 435 so as to be coupled to the tub. The fastening portions 435 may be formed at four corner portions along the edge of the base housing 430. When the base housing 430 is brought into close contact with the tub by the fastening portions 435, the shape of the base housing 430 may be changed so as to more closely contact the tub via the reinforcing ribs 434. In the case in which the entire surface of the base housing, rather than the reinforcing ribs 434, is brought into close contact with the tub, the contact force, which may be enhanced by the change in the shape of the base housing, is relatively low.

The above-described reinforcing ribs 434 may perform a function of spacing the base 432 of the base housing apart from the outer circumferential surface of the tub, a function of enhancing the rigidity of the base housing, and a function of securely bringing the base housing into close contact with the outer circumferential surface of the tub.

In addition, the reinforcing ribs 434 may form an air discharge path by spacing a large region of the base housing apart from the outer circumferential surface of the tub. The coil 420 can be evenly cooled through the air discharge path. In addition, air flows along the outer circumferential surface of the tub, which faces the base housing, and is then discharged from the region corresponding to the base housing, whereby the outer circumferential surface of the tub can be cooled.

The temperature of the portion of the outer circumferential surface of the tub on which the base housing is mounted may be higher than the temperature of the remaining portion of the outer circumferential surface of the tub. This is because the drum, which is located opposite the base housing, is heated, and accordingly the temperature of the portion of the outer circumferential surface of the tub on which the base housing is mounted is increased by the heated drum.

The increase in temperature of the outer circumferential surface of the tub means an increase in temperature of the inner circumferential surface of the tub that is located opposite the outer circumferential surface thereof. That is, when the outer circumferential surface of the tub is forcibly cooled, an increase in temperature of the inner circumferential surface of the tub, located opposite the outer circumferential surface thereof, may be suppressed, or the inner circumferential surface thereof may be cooled.

In the laundry treatment apparatus according to the above-described embodiment, the induction module, the module control unit and the outer circumferential surface of the tub can be cooled using a single fan.

In the above-described embodiment, the induction module and the module control unit are integrated into a single assembly, and the assembly is mounted above the tub. However, when the tub vibrates, the module control unit also vibrates together therewith, which may deteriorate the stability of the module control unit. For this reason, the module control unit and the induction module may be provided individually, and may be mounted at different positions from each other.

Figure 6:
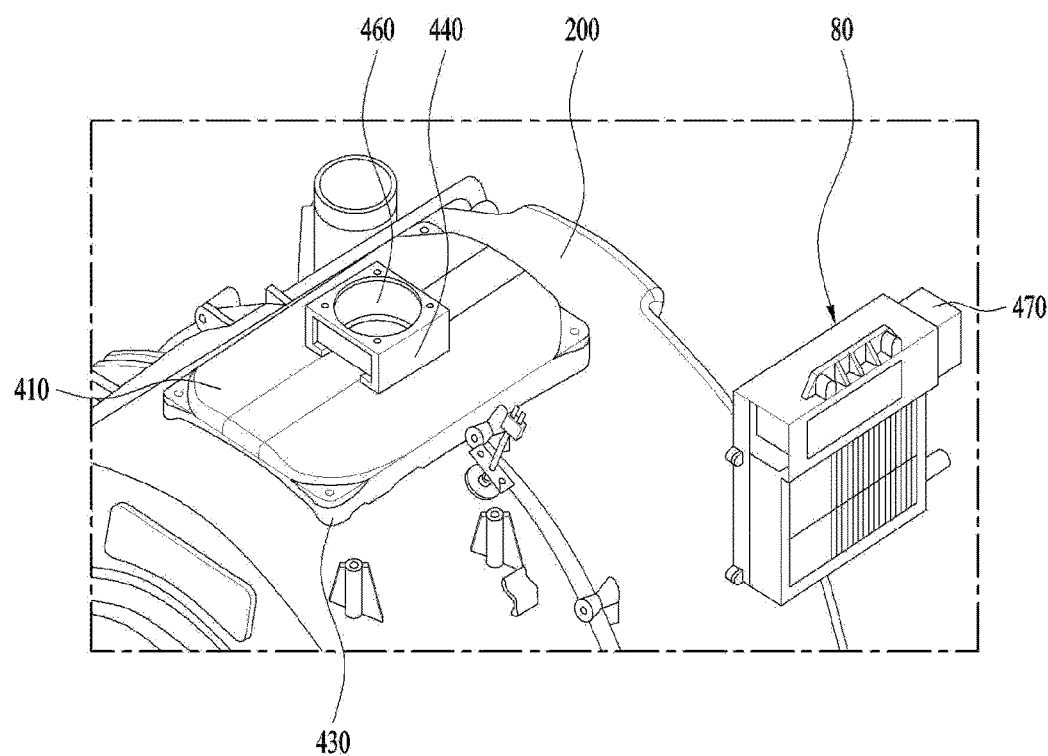
FIG. 6 is a view illustrating the positions of an induction module and a module control unit according to an embodiment of the present invention.

As shown in FIG. 6, in this embodiment, similar to the above-described embodiment, the induction module 400 may be mounted on the outer circumferential surface of the upper portion of the tub. The module control unit 80, which is provided separately from the induction module 400, may be located above the rear portion of the tub, and may be mounted to the cabinet 100. Since the module control unit 80 is secured to the cabinet, the stability of the module control unit 80 can be secured.

The shape, configuration and constituent components of the module control unit 80 may be the same as those of the module control unit in the above-described embodiment. However, because the module control unit 80 is formed separately from the induction module 400, a duct structure or a housing structure for connecting these two components to each other is different from that in the above-described embodiment.

The module control unit 80 may be mounted to the cabinet in the vertical direction. The reason for this is to further increase the spacing distance from the tub, which vibrates. This configuration can be realized due to the cylindrical shape of the tub. That is, the upper portion of the tub is gradually lowered from the center of the cabinet to both sides thereof. Therefore, the module control unit 80 can be mounted on the inner wall of the cabinet in the vertical direction, thus increasing the mounting area and consequently more securely fixing the module control unit 80 to the cabinet. In addition, since the spacing distance from the tub becomes longer than when the module control unit 80 is mounted horizontally, interference with the tub can be more assuredly prevented.

The module control unit 80 is connected with the ventilation hole 110 (refer to FIG. 3) formed in the rear side of the cabinet so that air is introduced into the module control unit 80 from outside the cabinet. A fan 470 may be mounted to the module control unit 80. Unlike the above-described embodiment, the module control unit 80 may not communicate with the induction module. Except for this configuration for non-communication, the external appearance of the housing, the internal structure and shape of the housing and the air flow path in the housing of the module control unit 80 may be the same as or similar to those in the above-described embodiment.

Therefore, the module control unit 80 in this embodiment may be configured such that it is cooled by a single fan 470.

The induction module 400 also needs to be cooled. To this end, a fan 460 may be provided solely for cooling the induction module 400.

The configuration of the induction module 400 may be the same as or similar to that in the above-described embodiment. However, because the induction module 400 is not connected with the module control unit 80, the configuration of the cover 410 may be different from that in the above-described embodiment.

Of course, the function of the cover 410 in this embodiment may be the same as that in the above-described embodiment. However, the cover 410 may be additionally provided with a structure for mounting the fan 460 thereto in order to draw air into the induction module 400 from outside the induction module 400.

It is desirable that external air be introduced into the center of the induction module 400 and move in the radial direction. To this end, a mounting portion for the fan 460 or an air inlet hole 440 may be formed in the center portion of the cover 410.

The induction module 400 may be generally formed in the shape of a plate that has a relatively low height. The cross-section of the induction module may correspond to the cross-section of the outer circumferential surface of the tub, on which the induction module is mounted. Thus, the induction module 400 may be very stably coupled to the tub. Similar to the above-described embodiment, the coil is interference-fitted into the mounting slot, and thus is not damaged by slight vibration. Further, because a substrate or other electronic components are not mounted in the induction module 400, the stability of the induction module 400 can be enhanced.

The suction direction of the fan 460 is a vertically downward direction. Therefore, an increase in the overall height of the induction module 400 attributable to the fan 460 and the fan-mounting portion may be minimized. Further, even when the tub vibrates, the fan 460 can stably suck air regardless of vibration because the suction direction thereof is the vertically downward direction. Furthermore, since the suction direction of the fan is the vertically downward direction, the fan can be stably fixed to the induction module 400.

In this embodiment, the air discharged from the induction module 400 cools the outer circumferential surface of the tub. In this embodiment, since the air that does not pass through the module control unit is introduced into the induction module 400, the performance of cooling of the induction module and the outer circumferential surface of the tub may be further enhanced.

In the above embodiments, the outer circumferential surface of the tub can be cooled by the air used to cool the induction module. The cooling of the outer circumferential surface of the tub may have the following meaning.

In the case of drying laundry in the drum by heating the drum, high-temperature and high-humidity air moves out of the drum and contacts the inner circumferential surface of the tub. In the case in which the temperature of the inner circumferential surface of the tub is relatively low, moisture contained in the high-temperature and high-humidity air may be condensed. It can be said that drying performance depends on condensing performance of removing evaporated moisture through condensation as well as heating performance.

Therefore, the condensing performance during the drying process can be further enhanced by indirectly cooling the inner circumferential surface of the tub through the process of cooling the outer circumferential surface of the tub.

The laundry treatment apparatus according to the above embodiments may be a laundry treatment apparatus that is capable of performing a drying process. The laundry treatment apparatus is configured to heat the outer circumferential surface of the drum, and thus may not include an air circulation structure using a circulation duct. That is, a fan for circulating air, a drying duct in which a heater is mounted, and a condensing duct in which a condensing unit is mounted may be omitted.

For example, the drying process may be performed after all of the wash water is discharged from the tub. The drying process may be performed when the washing process is completed. Of course, the drying process may be performed independently of the washing process. It is possible to condense moisture by cooling the inner circumferential surface of the tub during the drying process. The condensed moisture may move to the lower portion of the tub, and may be discharged outside through the drain pump 900 (refer to FIG. 1).

Hereinafter, a configuration for supplying cooling water to the interior of the tub according to an embodiment of the present invention will be described in detail. This embodiment may be applicable to a laundry treatment apparatus in which a drum is heated by an induction module, like the above embodiments.

However, this embodiment may also be applicable to other types of laundry treatment apparatuses. This is because cooling water may be supplied not only in order to perform condensation but also in order to decrease the temperature in the tub or the temperature in the drum.

For example, in the case of a laundry treatment apparatus in which a refreshing process is performed using steam, when the refreshing process is completed, the atmospheric temperature in the drum and the tub may be very high due to the steam. In this state, when a user takes laundry out of the drum, he/she may be hurt due to the high temperature. Thus, a configuration for decreasing the atmospheric temperature in the drum and the tub immediately after the completion of the refreshing process may be needed. To this end, this embodiment may be applied to a laundry treatment apparatus.

Hereinafter, embodiments in which cooling water can be more effectively supplied to the interior of the tub will be described in detail with reference to FIGS. 7 to 9.

Figure 7:
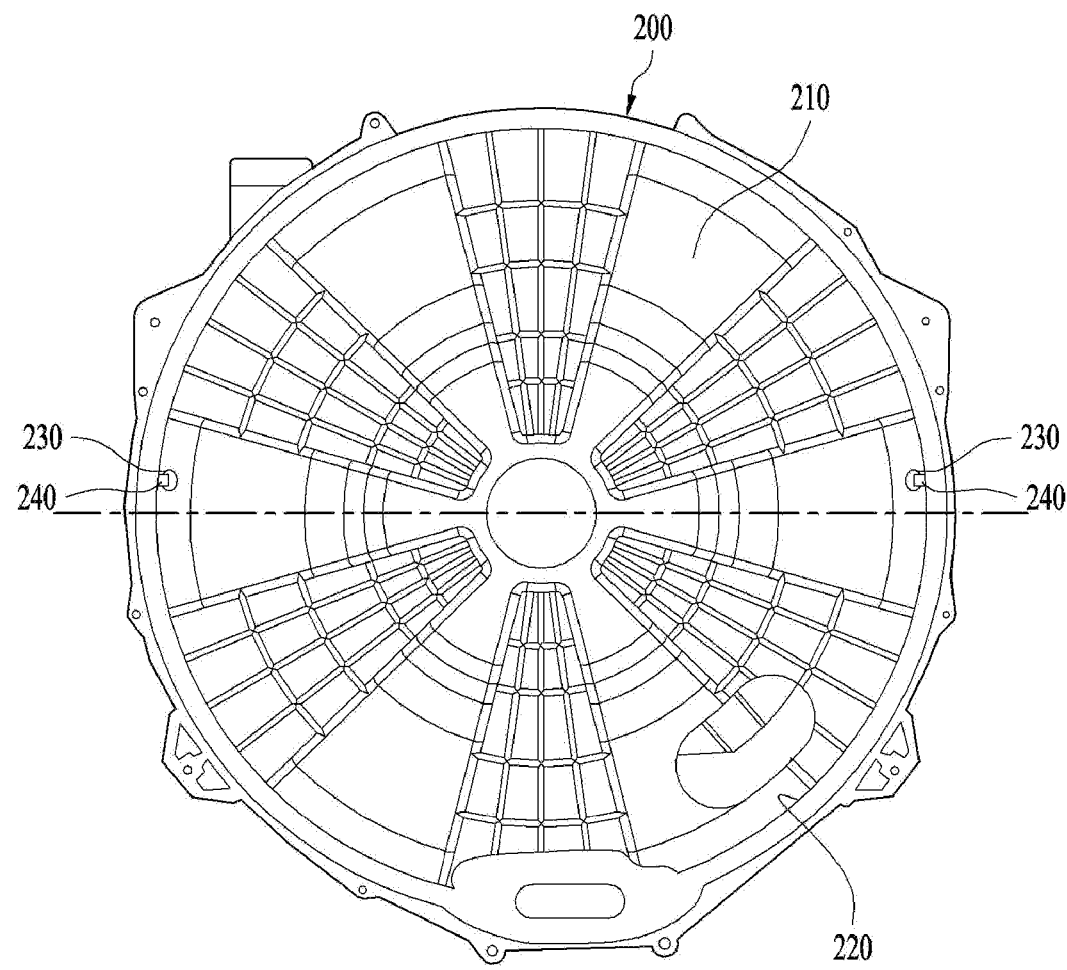
FIG. 7 is a view illustrating the position of a cooling water supply structure in a tub according to an embodiment of the present invention.
Figure 8:
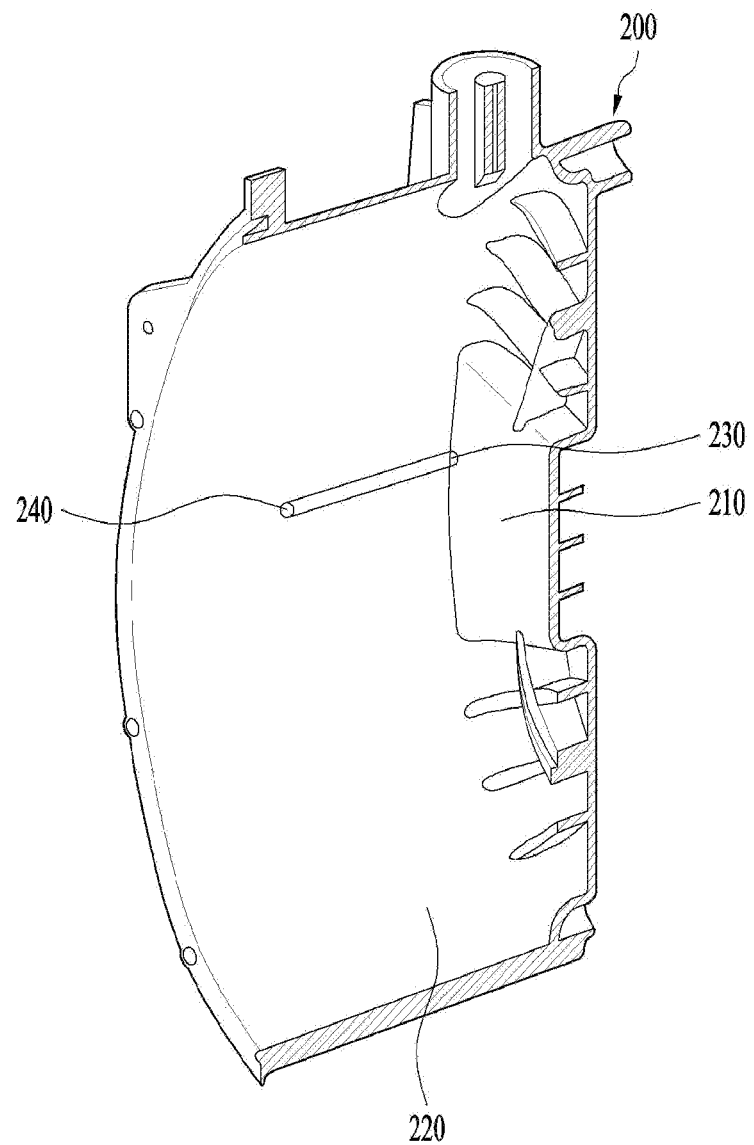
FIG. 8 is a view illustrating the cooling water supply structure shown in FIG. 7 when viewed from the interior of the tub.

As shown in FIG. 7, the tub 200 is provided with a cooling water port 230 for supplying cooling water to the interior of the tub. The cooling water is supplied to the inner circumferential surface of the tub through the cooling water port 230 so that heat exchange between the cooling water and the high-temperature and high-humidity air in the tub can be performed. The cooling water may be cold water that is supplied from an external water source.

The cooling water port 230 may be formed in the rear wall 210 inside the tub 200, and the cooling water supplied from the cooling water port 230 may be supplied to the inner circumferential surface of the tub 200 near the cooling water port 230. Accordingly, the cooling water can exchange heat with the high-temperature and high-humidity air in the tub while flowing downwards along the inner circumferential surface 220 of the tub 200.

In the state in which the cooling water supplied from the cooling water port 230 does not flow along the inner circumferential surface 220 of the tub but falls to the lower portion of the tub, the condensing efficiency is significantly lowered. The reason for this is that when the cooling water falls immediately without being dispersed, the contact time with the humid air becomes shorter and the contact area with the same also becomes smaller.

A decrease in condensing efficiency means a decrease in drying performance. That is, failure to remove the moisture evaporated from laundry will inevitably lead to an increase in drying time, which means that energy consumption is inevitably increased.

Therefore, it is very important to improve drying performance and energy consumption by increasing the contact time and the contact area between the cooling water supplied from the cooling water port 230 and the humid air.

The cooling water port 230 may be formed in the rear wall 210 inside the tub 200 so as to contact the inner circumferential surface 220. Accordingly, a portion of the cooling water supplied from the cooling water port 230 may be brought into contact with the inner circumferential surface 220 and may fall while moving toward the front side of the tub. However, the contact area between the supplied cooling water and the inner circumferential surface 220 is relatively small. This is because the direction in which the cooling water is supplied from the cooling water port 230 and the direction in which the inner circumferential surface 220 extends are parallel to each other. Therefore, only a portion of the cooling water moves forwards along the inner circumferential surface, and a large amount of cooling water falls to the bottom of the tub without contacting the inner circumferential surface.

In order to solve this problem, the direction in which the cooling water is supplied from the cooling water port 230 and the direction in which the inner circumferential surface extends may be set not to be parallel to each other, so that the supplied cooling water collides with the inner circumferential surface. However, in this case, when the cooling water collides with the inner circumferential surface, a large amount of cooling water does not flow along the inner circumferential surface, but is repelled and falls.

The present applicant has studied various ways to increase the contact time and area between the cooling water supplied from the cooling water port 230 and humid air, and has devised a way of effectively increasing condensing efficiency by distributing the stream of cooling water through a guide rib 240 in view of the surface tension characteristics of water.

The guide rib 240 may extend from the cooling water port 230 toward the front side of the tub 200. The guide rib 240 may be formed so as to protrude from a portion of the inner circumferential surface 220 of the tub in a radially inward direction.

The guide rib 240 may be provided to vertically divide the flow path of the cooling water supplied from the cooling water port 230. That is, the guide rib 240 may be formed at the center portion in the upward-and-downward direction of the cooling water port 230.

The cooling water supplied from the cooling water port 230 may be moved forwards along the inner circumferential surface 220 of the tub and the surface of the guide rib 240. Of course, while the cooling water is moved forwards, it may also be moved downwards. At this time, the downward movement occurs along the inner circumferential surface 220 of the tub.

Specifically, the guide rib 240 increases the contact area with the cooling water. Surface tension allows the cooling water to move toward the front side of the tub to some extent along the bottom surface of the guide rib 240 as well as the top surface of the guide rib 240.

The cooling water moving forwards along the top surface of the guide rib 240 is prevented from falling by the guide rib 240. When the cooling water moves further away from the guide rib 240, it falls along the inner circumferential surface 220.

Here, the cooling water present above the guide rib 240 may be a stream of water having a certain height. A portion of the cooling water that contacts the top surface of the guide rib 240 may fall due to friction immediately when it moves away from the guide rib 240. On the other hand, a portion of the cooling water that is located higher than the top surface of the guide rib 240 may move further forwards when it moves away from the guide rib 240. Accordingly, when the cooling water moves away from the top surface of the guide rib 240, it falls along the inner circumferential surface 220 of the tub in a fashion in which the width in the forward-and-backward direction is wide, in the manner of a stage curtain hanging down.

The pattern in which the cooling water moves along the bottom surface of the guide rib 240 may be the same as the pattern in which the cooling water moves along the top surface of the guide rib 240. However, the distance that the cooling water moves along the bottom surface of the guide rib 240 is relatively short because the influence of gravity thereon is greater than that on the cooling water that moves along the top surface of the guide rib 240.

For example, a portion of the cooling water that contacts the bottom surface of the guide rib 240 moves forwards along the guide rib. However, the cooling water may fall before it moves away from the guide rib due to gravity. A portion of the cooling water that is supplied to a position lower than the bottom surface of the guide rib 240 may move forwards a shorter distance than the cooling water moving along the bottom surface of the guide rib 240.

As described above, the guide rib 240 functions to vertically partition the stream of cooling water supplied from the cooling water port 230, and accordingly it is possible to form cooling water flow having a width that is greater than the length from the cooling water port 230 to the distal end of the guide rib 240. That is, the width in the forward-and-backward direction of the curtain-shaped flow of the cooling water along the inner circumferential surface 220 of the tub can be made very large.

This increase in width in the forward-and-backward direction of the cooling water flow may lead to an increase in heat transfer time between the cooling water and humid air as well as an increase in heat transfer area therebetween.

The cross-section of the illustrated guide rib 240 may have a circular shape. However, in order to increase the friction area between the guide rib 240 and the cooling water and to effectively separate the cooling water flowing along the top surface of the guide rib 240 and the cooling water flowing along the bottom surface of the guide rib 240 from each other, it may be more desirable to form the guide rib 240 so as to have a rectangular-shaped cross-section.

In order to increase the condensing efficiency, the cooling water port 230 may be provided in two parts, each being formed at a respective one of the left side and the right side of the tub. In the same manner, the guide rib 240 may be provided in two parts, each being formed at a respective one of the left side and the right side of the tub. Therefore, the heat transfer area can be doubled, and accordingly the condensing efficiency can be further increased.

The cooling water can be bifurcated and supplied through the two cooling water ports 230. That is, compared to the configuration in which the cooling water is supplied through a single cooling water port 230, the total amount of cooling water supplied is the same, but the supply position of the cooling water can be divided into two.

For example, the cooling water supply pressure or the amount of cooling water that is supplied may be constant regardless of the number of cooling water ports 230. For example, the total amount of cooling water that is supplied may not be significantly different between the case in which cooling water is supplied simultaneously from the two divided cooling water ports and the case in which cooling water is supplied from one of the two divided cooling water ports. However, in the former case, an increase in heat transfer area and an increase in heat transfer time are expected, and thus the condensing performance thereof may be better.

As the drying process progresses, the amount of moisture that evaporates varies over time. At the beginning of the drying process, the amount of moisture that evaporates is relatively small due to sensible heat rise. Therefore, at this time, high condensing performance is not required. In this case, when excess cooling water is supplied, the drying performance may be deteriorated by the evaporation of the cooling water.

In the middle of the drying process, in which the sensible heat rise is finished and moisture is evaporated by latent heat, the amount of moisture evaporated is relatively large. As this time, high condensing performance is required.

Therefore, according to this embodiment, it is possible to secure appropriate cooling performance depending on the drying process using two cooling water ports simultaneously or using only one cooling water port. That is, excessive cooling or insufficient cooling can be prevented in advance.

The guide rib 240 may extend at a downward incline toward the front side of the tub. The tub has a configuration that vibrates. Therefore, the cooling water flowing along the guide rib 240 may be quickly separated from the guide rib 240 due to the vibration of the tub attributable to the operation of the drum or attributable to an external factor. That is, the cooling water may not flow sufficiently along the guide rib 240, but may be immediately separated from the guide rib 240. The cooling water flowing along the top surface of the guide rib 240 is prevented from falling by the guide rib 240, and thus the amount of cooling water that is separated from the top surface of the guide rib 240 by the vibration is relatively small. However, the vibration promotes falling of the cooling water that flows along the bottom surface of the guide rib 240.

In order to prevent the cooling water from being separated from the guide ribs 240 due to vibration, the guide rib 240 may be formed at a downward incline toward the front side of the tub. The vertical vector component of the direction in which the guide rib is inclined downwards is the same as the direction in which the cooling water falls due to gravity or vibration. Therefore, the cooling water can flow a relatively long distance along the guide rib 240 even when vibration occurs.

It is desirable that the angle of downward inclination be very gentle. The reason for this is that when the angle of downward inclination is increased, the gravity component becomes much greater than the surface tension component.

The cooling water port 230 may be located above the center in the upward-and-downward direction of the tub. Specifically, the cooling water port 230 may be located at an angular position that is located above the center in the upward-and-downward direction of the tub at an angle ranging from about 5 to 10 degrees with respect to the horizontal center line.

The high-temperature and high-humidity air inside the tub has a tendency to rise. Therefore, it is desirable to form a configuration in which heat transfer between the cooling water and humid air occurs in the region above the center in the upward-and-downward direction of the tub, rather than in the region under the center in the upward-and-downward direction of the tub.

Further, the falling distance and the falling time of the cooling water that falls from the center in the upward-and-downward direction of the tub or the region under the center may be short. Therefore, the heat transfer area and the heat transfer time may be reduced. Therefore, it is desirable to form the cooling water port 230 at a position that is slightly higher than the center in the upward-and-downward direction of the tub.

However, it is not desirable to form the cooling water port 230 at a higher position. This is because the angle of the inner circumferential surface of the tub, which corresponds to a higher position, is too steep to prevent vertical falling of the cooling water. Therefore, in the case in which the cooling water port 230 is formed at a higher position, the cooling water may fall vertically without flowing down along the inner circumferential surface of the tub.

In order to increase the heat transfer area or the heat transfer time, on the premise that the cooling water flows down along the inner circumferential surface of the tub, it may be desirable for the cooling water port 230 to be located at a higher position in the tub. However, in the case in which the tub is provided only with the cooling water port 230, the cooling water falls directly without flowing along the inner circumferential surface of the tub, and thus the location of the cooling water port at a higher position is significantly restricted.

In this embodiment, the guide rib 240 may include a protrusion for preventing the falling of the cooling water. Therefore, it is possible to move the cooling water port to a higher position when the guide rib 240 is provided than when the guide rib 240 is not provided. Therefore, it is possible to further improve a cooling effect not only through the inherent function of the guide rib 240 but also through the movement of the location of the cooling water port to a higher position, which is achievable by the guide rib 240.

Figure 9:
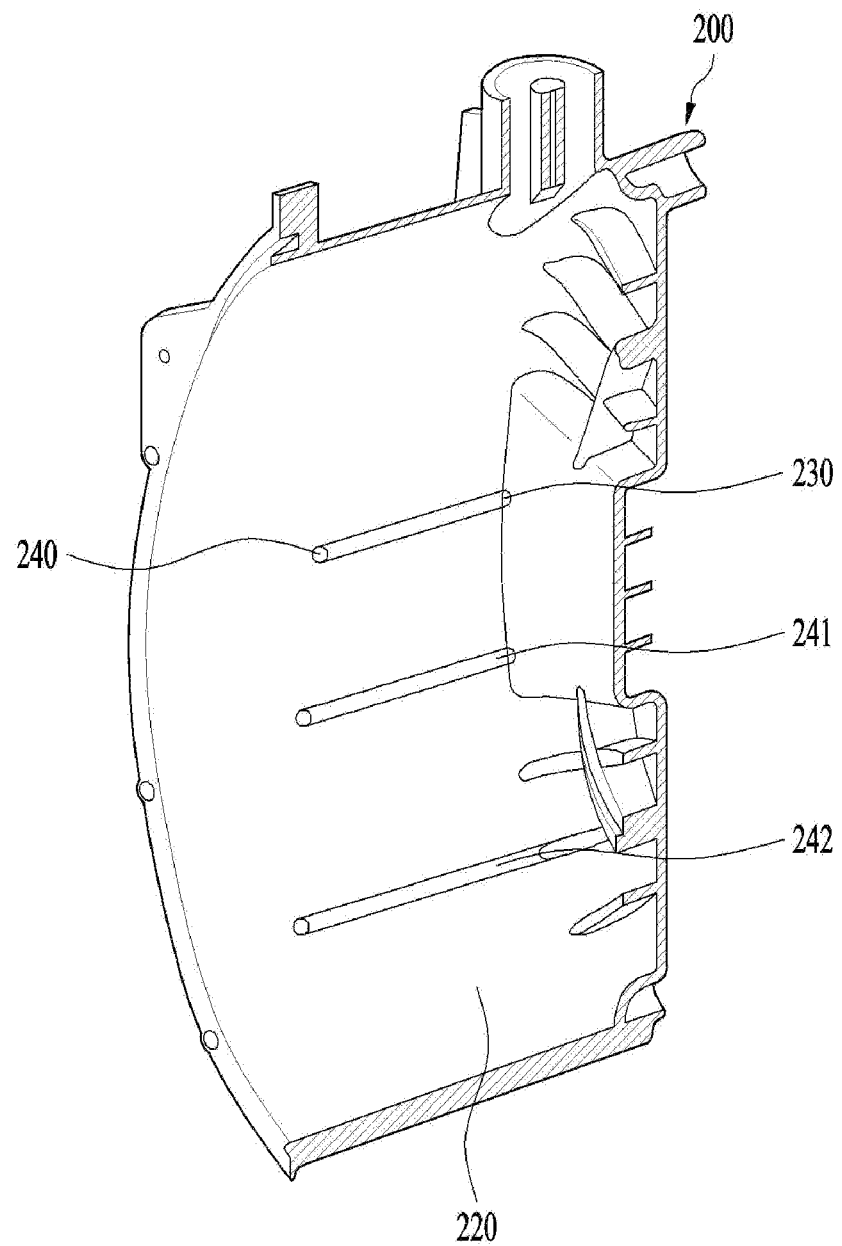
FIG. 9 is a view illustrating a cooling water supply structure according to an embodiment of the present invention.

FIG. 9 illustrates an embodiment that can be implemented in combination with the above-described embodiments.

As described above, the width in the forward-and-backward direction of the cooling water is determined corresponding to the length of the guide rib 240. It is desirable to increase the width in the forward-and-backward direction of the cooling water by increasing the length of the guide rib 240. However, in the state in which the length of the guide rib 240 is excessively increased, the cooling water may not escape from the guide rib 240, and may flow down along the side surface of the guide rib. In this case, the width of the cooling water or the amount of cooling water that flows along the inner circumferential surface of the tub may be remarkably reduced. Therefore, an increase in the length of the guide rib 240 is restricted.

The cooling water falling from the bottom surface of the guide rib 240 flows to the bottom of the tub. Here, an auxiliary guide rib 241 may be formed under the guide rib 240 so that the cooling water can flow in a stepwise manner. Therefore, the heat transfer time and the heat transfer area may be further increased.

The auxiliary guide rib 241 may be formed to be longer than the guide rib 240. Therefore, the auxiliary guide rib 241 may further increase the width in the forward-and-backward direction of the cooling water that flows along the bottom surface of the auxiliary guide rib 241.

Another auxiliary guide rib 242 may be additionally formed under the aforementioned auxiliary guide rib 241. The additional auxiliary guide rib 242 may perform the same function as the aforementioned auxiliary guide rib 241, and may be longer than the same.

Accordingly, the cooling water flows downwards along the inner circumferential surface of the tub in a stepwise manner. Therefore, the width in the forward-and-backward direction of the cooling water flow, i.e. the width that corresponds to the lateral width of the above-described stage curtain, may be further increased. Therefore, the heat transfer area and the heat transfer time may be increased. An increase in the heat transfer area means that the cooling water flows downwards with a very thin flow thickness. Therefore, the speed at which the cooling water flows downwards becomes relatively low, which leads to an increase in the heat transfer time.

This cooling water supply structure may be applied to a drying process of a laundry treatment apparatus using an induction module.

When the induction module is driven, the drum is heated to heat laundry. At this time, when the drum is rotated, the contact time between the heated drum and the laundry becomes very short, and thus moisture is evaporated while minimizing thermal damage to the laundry. When the moisture is completely evaporated, cooling water is supplied to condense the evaporated moisture, and the drying process is performed.

In the laundry treatment apparatus according to this embodiment, a controller may be provided to control the operation of the induction module, the rotation of the drum and the supply of the cooling water in order to perform the drying process.

In order to improve condensing efficiency and cooling performance, the temperature of the inner circumferential surface of the tub as well as an increase in the heat transfer area and the heat transfer time due to the cooling water is very important. The temperature of the inner circumferential surface of the tub, particularly the temperature of the inner circumferential surface of the tub corresponding to the induction module, may be relatively high due to the heating of the drum. Therefore, the cooling water flowing along the inner circumferential surface of the tub may receive heat from the inner circumferential surface of the tub, and the temperature thereof may be increased. Therefore, the temperature of the cooling water rises, which may deteriorate heat transfer efficiency.

For this reason, it is desirable that the temperature of the inner circumferential surface of the tub along which the cooling water flows be lowered as much as possible. In the above-described embodiments, the air that has cooled the induction module is used to lower the temperature of the outer circumferential surface of the tub. By lowering the temperature of the outer circumferential surface of the tub, it is possible to suppress an increase in the temperature of the inner circumferential surface of the tub that is located opposite the outer circumferential surface of the tub.

Therefore, when the induction module is driven for the drying process, the induction module and the outer circumferential surface of the tub can be cooled at the same time, thus preventing deterioration in condensing performance.

As is apparent from the above description, a laundry treatment apparatus according to an embodiment of the present invention is capable of reducing energy consumption and enhancing drying performance by effectively improving moisture-condensing performance using cooling water.

In addition, a laundry treatment apparatus according to an embodiment of the present invention is capable of highly effectively enhancing drying performance and reducing energy consumption through addition of a simple structure or a change in the structure.

In addition, a laundry treatment apparatus according to an embodiment of the present invention is capable of greatly increasing a heat transfer area and heat transfer time of cooling water using a guide rib that guides movement of the cooling water.

In addition, a laundry treatment apparatus according to an embodiment of the present invention is capable of cooling the outer circumferential surface of a tub while performing a drying process, thereby restricting an increase in temperature of the tub attributable to the drying process and consequently improving drying performance.

In addition, a laundry treatment apparatus according to an embodiment of the present invention is capable of improving safety, stability and efficiency.

In addition, a laundry treatment apparatus according to an embodiment of the present invention is capable of improving efficiency and stability by effectively cooling an induction module and a module control unit.

In addition, a laundry treatment apparatus according to an embodiment of the present invention has high economic feasibility by cooling an induction module, a module control unit and the outer circumferential surface of a tub by driving a single fan.

In addition, a laundry treatment apparatus according to an embodiment of the present invention is configured such that an induction module is stably coupled to a tub and such that an internal air flow path and an air discharge path are formed, thereby effectively cooling the induction module and also cooling the outer circumferential surface of the tub simultaneously therewith.

In addition, a laundry treatment apparatus according to an embodiment of the present invention is configured such that an induction module and a module control unit are provided individually and are mounted to a tub and a cabinet, respectively, thereby enhancing the performance exhibited by the induction module and securing the stability of the module control unit.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A laundry treatment apparatus comprising:
    a cabinet;
    a tub provided in the cabinet;
    a drum rotatably provided in the tub, the drum being made of a metallic material;
    an induction module provided on an outer side surface of the tub and configured to heat the drum via induction using a magnetic field generated by applying a current to a coil in the induction module; and
    a module control unit configured to control output of the induction module, the module control unit comprising:
    a housing that defines an airflow path therein,
    a substrate provided in the housing, and
    a power transistor mounted on the substrate.

2. The laundry treatment apparatus according to claim 1, wherein the module control unit further comprises a heat sink configured to dissipate heat from the power transistor, and
    wherein the airflow path is defined along the heat sink and the power transistor.

3. The laundry treatment apparatus according to claim 1, wherein the housing comprises:
    an air inlet hole through which air is introduced into the housing from an outside of the housing; and
    an air outlet hole through which the air introduced into the housing is discharged outside of the housing, and
    wherein the airflow path is defined between the air inlet hole and the air outlet hole.

4. The laundry treatment apparatus according to claim 3, wherein the air inlet hole, the air outlet hole, and the airflow path are defined at a first side of the housing, wherein a penetration portion is defined at a second side of the housing that is opposite the first side, and that is configured to cool the substrate using convection, and wherein the housing comprises a partition wall that partitions the housing into the first side of the housing and the second side of the housing.

5. The laundry treatment apparatus according to claim 4, wherein the penetration portion comprises a plurality of communication holes.

6. The laundry treatment apparatus according to claim 5, wherein the plurality of communication holes comprise side-surface communication holes and top-surface communication holes, wherein the side-surface communication holes are defined at a side surface of the housing that is located closest to an outside of the cabinet, and wherein the top-surface communication holes are defined at a top surface of the housing and configured to discharge heated air therethrough.

7. The laundry treatment apparatus according to claim 1, further comprising:

a cooling path configured to allow air to sequentially flow from an outside of the cabinet into (i) the airflow path defined in the housing of the module control unit and (ii) an interior of the induction module; and a fan provided in the cooling path.

8. The laundry treatment apparatus according to claim 7, wherein the cooling path comprises:

a duct provided at a rear side of the cabinet and configured to allow air to flow between the outside of the cabinet and an interior of the cabinet;

the airflow path defined in the housing of the module control unit; and a connection duct through which air flows between the interior of the induction module and an interior of the housing, and wherein the fan is provided between the duct and the housing.

9. The laundry treatment apparatus according to claim 8, wherein the connection duct is arranged such that a portion of a casing of the induction module and a portion of the housing of the module control unit are connected to each other.

10. The laundry treatment apparatus according to claim 8, wherein the module control unit is provided behind an upper portion of the tub.

11. The laundry treatment apparatus according to claim 10, wherein the induction module comprises:

a base housing to which the coil is configured to be secured, the base housing configured to be mounted on an outer circumferential surface of the tub; and a cover that is configured to be coupled to an upper side of the base housing and that defines, in a state of being coupled to the base housing, a space inside the induction module.

12. The laundry treatment apparatus according to claim 11, wherein the connection duct is configured to discharge air from an upper center portion of the base housing in a radial direction.

13. The laundry treatment apparatus according to claim 11, wherein the base housing comprises:

a mounting slot defined in the base housing and configured to accommodate the coil in the induction module;

a seating rib protruding downwards from a bottom surface of the base housing and configured to be seated on the outer circumferential surface of the tub; and an opening that penetrates through the bottom surface of the base housing.

14. The laundry treatment apparatus according to claim 13, wherein the base housing comprises a sealed portion through which the opening is not defined, and wherein the opening and the sealed portion are defined alternately along a longitudinal direction and along a width direction of the base housing.

15. The laundry treatment apparatus according to claim 14, wherein the mounting slot is defined in the sealed portion, and wherein the coil is configured to be mounted on the sealed portion and the opening.

* * * * *